(12) United States Patent
Zhang et al.

(10) Patent No.: US 10,454,198 B2
(45) Date of Patent: Oct. 22, 2019

(54) CONNECTING MECHANISM

(71) Applicant: GOERTEK TECHNOLOGY CO., LTD., Qingdao, Shandong (CN)

(72) Inventors: Zhongli Zhang, Qingdao (CN); Ying Zhang, Qingdao (CN); Lei Huang, Qingdao (CN)

(73) Assignee: GOERTEK TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 16/065,606

(22) PCT Filed: Oct. 27, 2017

(86) PCT No.: PCT/CN2017/108025
§ 371 (c)(1),
(2) Date: Jun. 22, 2018

(87) PCT Pub. No.: WO2018/233169
PCT Pub. Date: Dec. 27, 2018

(65) Prior Publication Data
US 2019/0280416 A1    Sep. 12, 2019

(30) Foreign Application Priority Data

Jun. 21, 2017 (CN) .......................... 2017 1 0476219
Aug. 30, 2017 (CN) .......................... 2017 1 0763592
Aug. 30, 2017 (CN) .......................... 2017 1 0763643

(51) Int. Cl.
*H01R 13/62* (2006.01)
*H01R 13/422* (2006.01)
(Continued)

(52) U.S. Cl.
CPC ....... *H01R 13/422* (2013.01); *G02B 27/0176* (2013.01); *G06F 1/16* (2013.01);
(Continued)

(58) Field of Classification Search
USPC ....................................................... 439/369
See application file for complete search history.

(56) References Cited

U.S. PATENT DOCUMENTS 8,833,117 B2 * 9/2014 Yang ..................... E05B 37/025
70/14
10,317,683 B2 * 6/2019 Yang .................... H04R 5/0335
(Continued)

FOREIGN PATENT DOCUMENTS

CN    203362718 U    12/2013
CN    204271364 U     4/2015
(Continued)

OTHER PUBLICATIONS

KR Office Action dated Apr. 17, 2019 as received in Application No. 10-2018-7019981 (English Translation).

*Primary Examiner* — Jean F Duverne
(74) *Attorney, Agent, or Firm* — Maschoff Brennan

(57) ABSTRACT

A connecting mechanism includes a body and a detachable part connected with the body. The body includes a casing and a sliding component. The casing has an insertion hole for insertion of the detachable part. The sliding component is in sliding connection with the casing, and the sliding component has access holes and clamping holes in communication therewith. The detachable part includes insertion pieces. When the sliding component slides from a first position to a second position, the access holes are opposite to the insertion hole, and the insertion pieces extend into the access holes through the insertion hole. When the sliding component slides from the second position to the first position, the insertion pieces enter the clamping holes from the access holes, thereby locking the detachable part. The assembly and disassembly of the detachable part and the body are realized through the operation of the sliding component without tools.

20 Claims, 9 Drawing Sheets

(51) Int. Cl.
*G02B 27/01* (2006.01)
*H01R 13/02* (2006.01)
*H01R 13/639* (2006.01)
*G06F 1/16* (2006.01)
*H01R 13/73* (2006.01)
*H04R 1/10* (2006.01)

(52) U.S. Cl.
CPC ........... *H01R 13/02* (2013.01); *H01R 13/639* (2013.01); *H01R 13/73* (2013.01); *H04R 1/1091* (2013.01)

(56) References Cited

U.S. PATENT DOCUMENTS

| | | | | |
|---|---|---|---|---|
| 2013/0195307 A1* | 8/2013 | Mizuno | ................ | H04R 1/1091 |
| | | | | 381/374 |
| 2013/0237146 A1* | 9/2013 | Serota | ................ | G02B 27/017 |
| | | | | 455/12.1 |
| 2015/0309316 A1* | 10/2015 | Osterhout | ............... | G06F 3/012 |
| | | | | 345/8 |
| 2016/0241947 A1* | 8/2016 | Degraye | ................ | H04R 3/12 |
| 2018/0063626 A1* | 3/2018 | Pong | ................ | H04R 1/1066 |
| 2018/0074549 A1 | 3/2018 | Chen et al. | | |

FOREIGN PATENT DOCUMENTS

| | | |
|---|---|---|
| CN | 204459635 U | 7/2015 |
| CN | 106211795 A | 12/2016 |
| CN | 206947634 U | 1/2018 |
| JP | 2001152677 A | 6/2001 |
| JP | 2002009911 A | 1/2002 |
| KR | 10-2001-037899 A | 5/2001 |
| WO | 2016/154827 A1 | 10/2016 |

\* cited by examiner

CONNECTING MECHANISM

CROSS REFERENCE TO RELATED APPLICATIONS

This application refers to Chinese Patent Application No. 201710476219.2 entitled "Connecting Mechanism" filed on Jun. 21, 2017, Chinese Patent Application No. 201710763592.6 entitled "Connecting Mechanism" filed on Aug. 30, 2017, and Chinese Patent Application No. 2017104763643.5 entitled "Connecting Mechanism and Virtual Reality Device" filed on Aug. 30, 2017, which are all incorporated herein by reference in their entirety.

TECHNICAL FIELD

The embodiments of the present application belong to the technical field of wearable devices, and in particular relate to a connecting mechanism.

BACKGROUND

With the popularity of VR (virtual reality) products, there are many virtual reality head-mounted devices in market. Many products are not equipped with earphones matched with the virtual reality head-mounted devices out of consideration of product functions and wearing comfort.

SUMMARY

One aspect of embodiments of the present application provides a connecting mechanism, comprising: a body and a detachable part connected with the body, wherein, the body comprises a casing and a sliding component, the casing is provided with an insertion hole for insertion of the detachable part, the sliding component is in sliding connection with the casing, and the sliding component is provided with an access hole and a clamping hole which communicates with the access hole;

The detachable part comprises an insertion piece;

when the sliding component slides from a first position to a second position, the access hole is opposite to the insertion hole, and the insertion piece of the detachable part extends into the access hole through the insertion hole;

when the sliding component slides from the second position to the first position, the insertion piece of the detachable part enters the clamping hole from the access hole, so that the sliding component locks the detachable part through the clamping hole.

BRIEF DESCRIPTION OF THE DRAWINGS

In order to more clearly illustrate the embodiments of the present application or the technical solutions in the prior art, the drawings needed to be used in the description of the embodiments or the prior art will be briefly described. Apparently, the drawings in the following description are some of the embodiments of the present application. For those of ordinary skill in the art, other drawings may also be obtained according to these drawings without any creative work.

The drawings described herein are used to provide a further understanding of the embodiments of the present application and constitute a part of the embodiments of the present application. The exemplary embodiments of the present application and descriptions thereof are used to explain the embodiments of the present application and do not constitute improper limitation to the embodiments of the present application.

In the accompany drawings:

FIG. 1 is a structural diagram of a connecting mechanism according to embodiment 1 of the present application;

FIG. 2 is a partial exploded structural diagram of a connecting mechanism according to embodiment 2 of the present application;

FIG. 3 is a mounting structure diagram of a conductive plate type compression spring according to embodiment 2 of the present application;

FIG. 4 is an exploded structural diagram of a sliding component and an inner cover according to embodiment 2 of the present application;

FIG. 5 is a structural diagram of the conductive plate type compression spring according to embodiment 2 of the present application;

FIG. 6 is a mounting structure diagram of a cover plate according to embodiment 2 of the present application;

FIG. 7 is a structural diagram of a detachable part according to embodiment 2 of the present application;

FIG. 8 is a mounting structure diagram of the detachable part according to embodiment 2 of the present application;

FIG. 9 is a mounting structure perspective diagram of the detachable part according to embodiment 2 of the present application;

FIG. 10 is an exploded structural diagram of a connecting mechanism according to embodiment 3 of the present application;

FIG. 11 is a structural diagram of a sliding component according to embodiment 3 of the present application;

Figure 12:
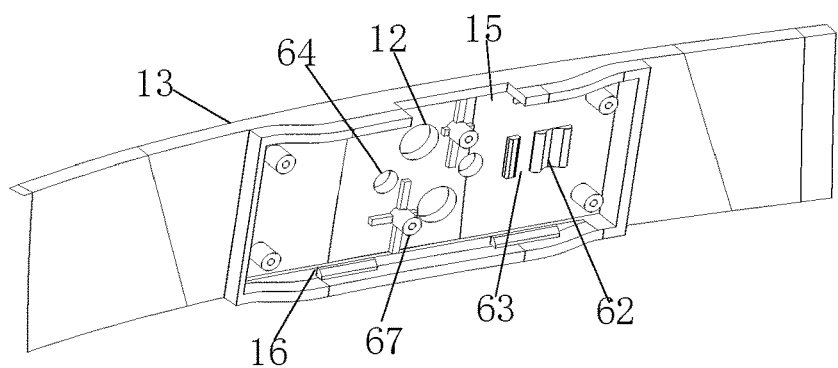
Figure 13:
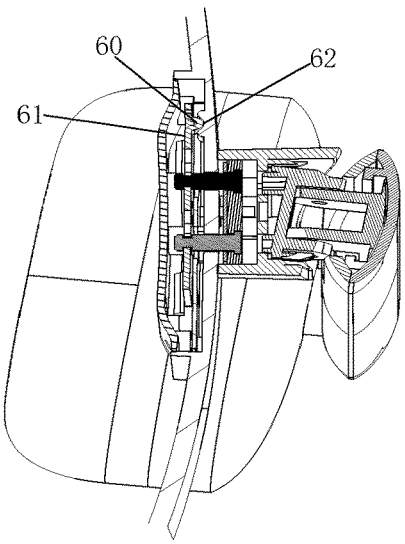
Figure 14:
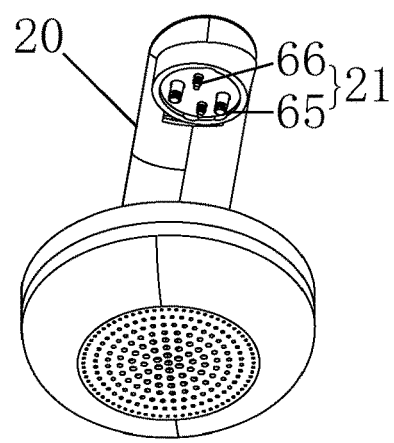
Figure 15:
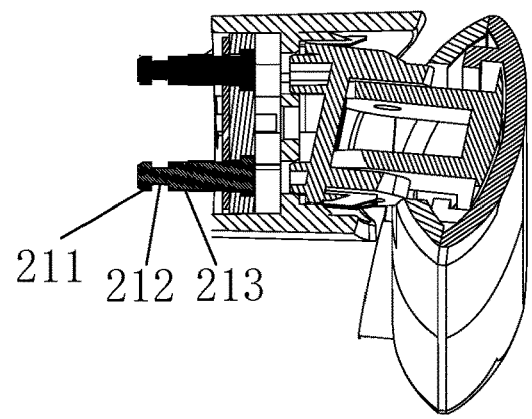
Figure 16:
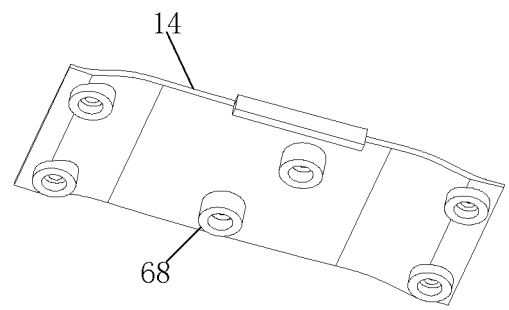
Figure 17:
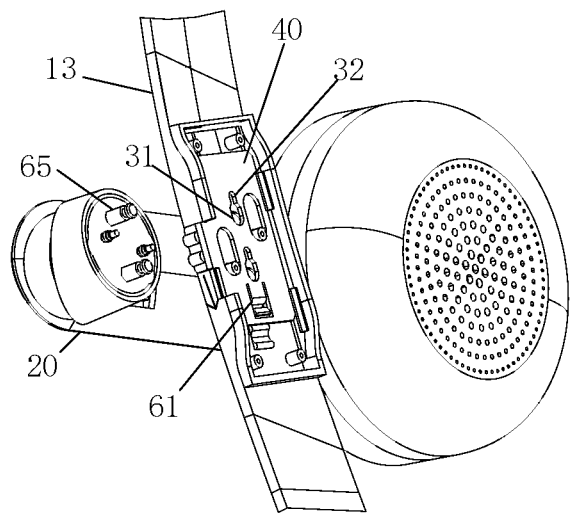
Figure 18:
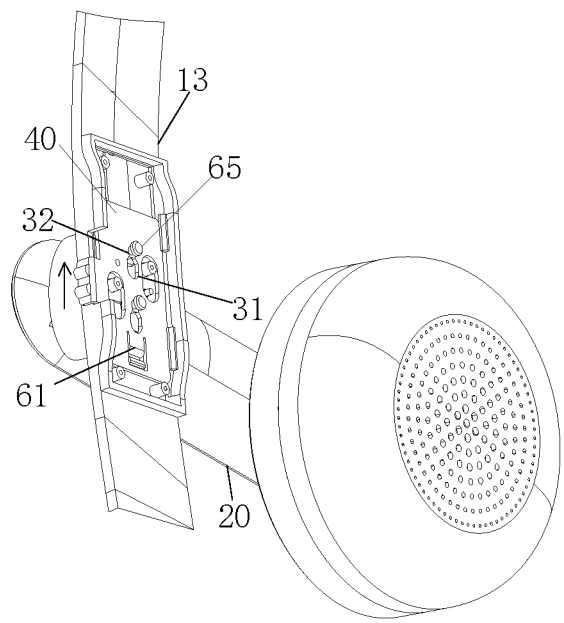
Figure 19:
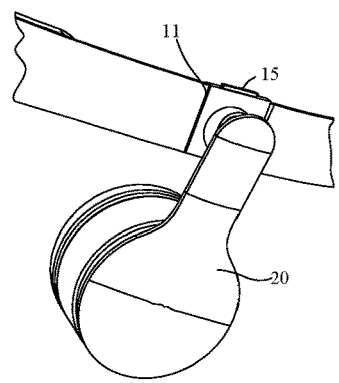
Figure 20:
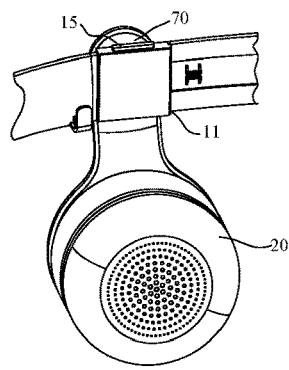
Figure 21:
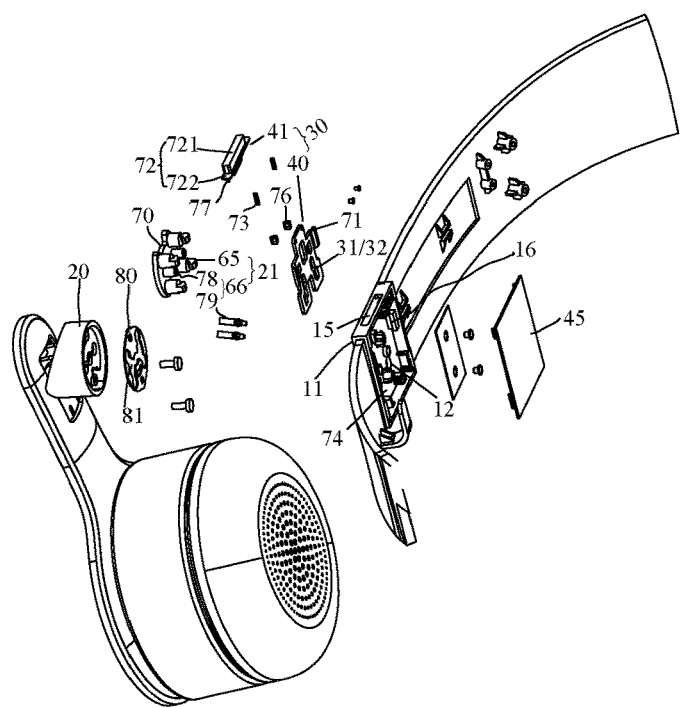
Figure 22:
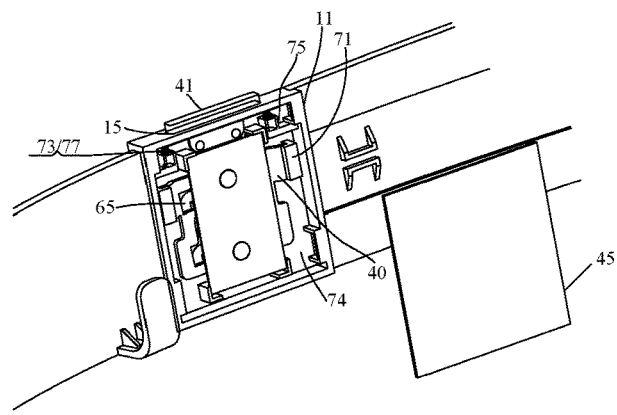
Figure 23:
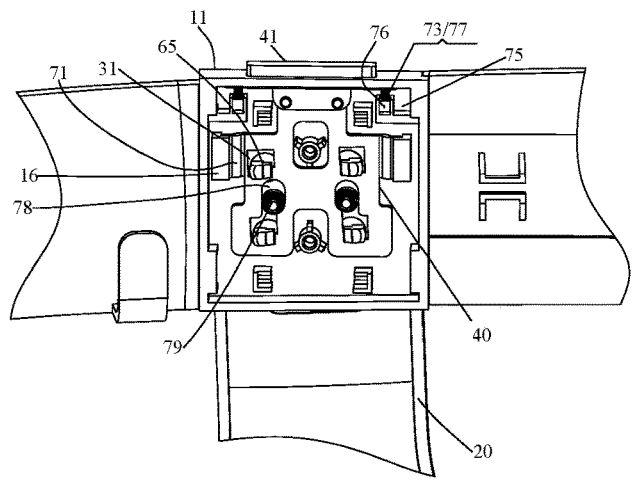
Figure 24:
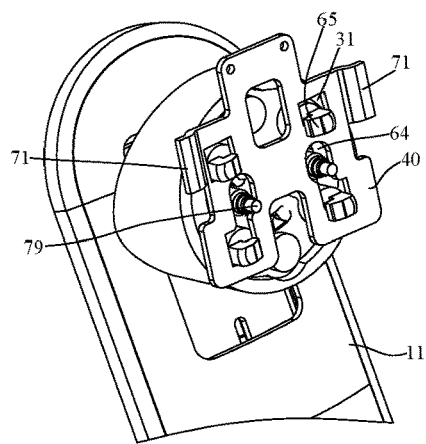
Figure 25:
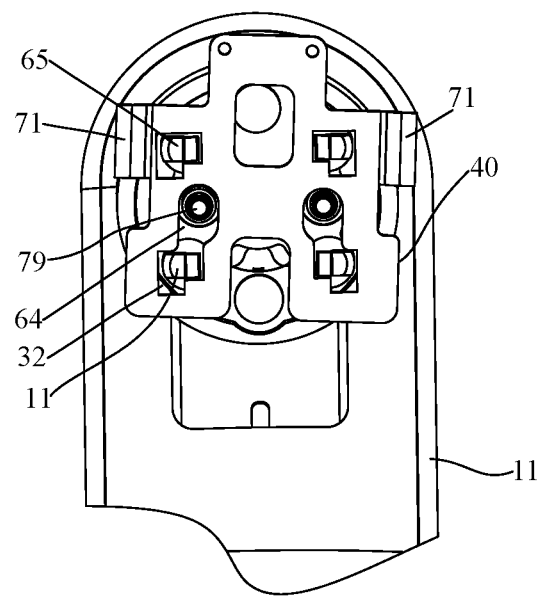
Figure 26:
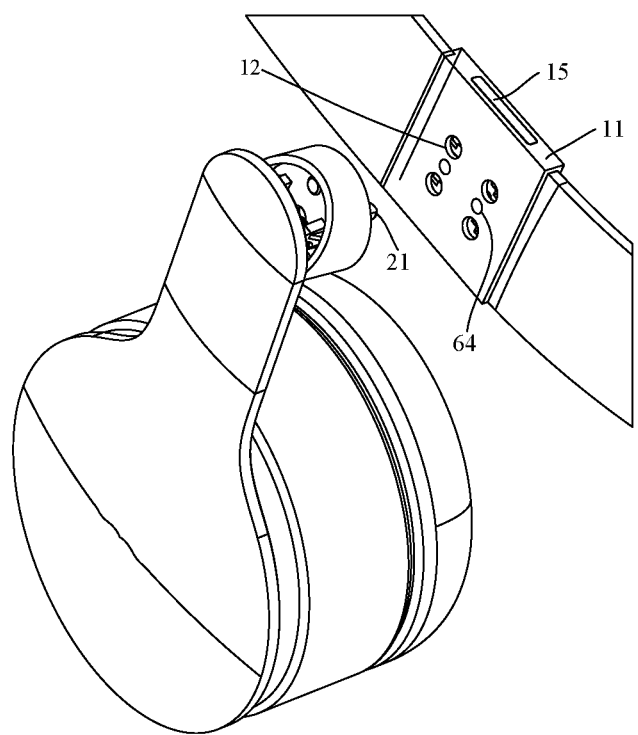

FIG. 12 is a structural diagram of an outer cover according to embodiment 3 of the present application;

FIG. 13 is a partial sectional diagram of a casing and a detachable part according to embodiment 3 of the present application;

FIG. 14 is a structural diagram of the detachable part according to embodiment 3 of the present application;

FIG. 15 is a partial sectional diagram of the detachable part according to embodiment 3 of the present application;

FIG. 16 is a structural diagram of an inner cover according to embodiment 3 of the present application;

FIG. 17 is a perspective diagram of the mounting condition of the connecting mechanism according to embodiment 3 of the present application;

FIG. 18 is a perspective diagram of the dismounting condition of the connecting mechanism according to embodiment 3 of the present application;

FIG. 19 is a first partial three-dimensional structural diagram of a connecting mechanism according to embodiment 4 of the present application (from the view of the outer side of a casing);

FIG. 20 is a second partial three-dimensional structural diagram of the connecting mechanism according to embodiment 4 of the present application (from the view of the inner side of the casing);

FIG. 21 is an exploded structural diagram of FIG. 20;

FIG. 22 is a mounting structure diagram of a connecting mechanism according to embodiment 4 of the present application;

FIG. 23 is an internal structural diagram of FIG. 20;

FIG. 24 is a structural diagram of the connecting mechanism according to embodiment 4 of the present application when an insertion piece and a clamping hole are in a clamped state (a detachable part is only partially shown);

FIG. 25 is a structural diagram of embodiment 4 of the present application when a sliding plate moves under the pressing of a shifting pillar to disengage the insertion piece from the clamping hole (the detachable part is only partially shown); and FIG. 26 is a structural diagram of embodiment 4 of the present application when the detachable part and a casing are separated.

DETAILED DESCRIPTION

To make the objectives, technical solutions, and advantages of the embodiments of the present application more comprehensible, the technical solutions in the embodiments of the present application will be described clearly and thoroughly below with reference to the accompanying drawings in the embodiments of the present application. Obviously, the described embodiments are part of the embodiments of the present application, rather than all the embodiments. Based on the embodiments in the embodiments of the present application, all other embodiments obtained by those of ordinary skill in the art without making creative efforts shall fall within the protection scope of the embodiments of the present application. The embodiments of the present application provide a connecting mechanism, in which a detachable part can be easily and conveniently mounted on and detached from a body, so as to be replaced according to different requirements.

The implementations of the embodiments of the present application will be described in detail below with reference to the accompanying drawings and embodiments, so as to fully understand and implement the implementation process of how to apply technical means to solve technical problems and achieve technical effects according to embodiments of the present application. The structure of the present application will be further illustrated below with reference to the drawings.

Embodiment 1

Figure 1:
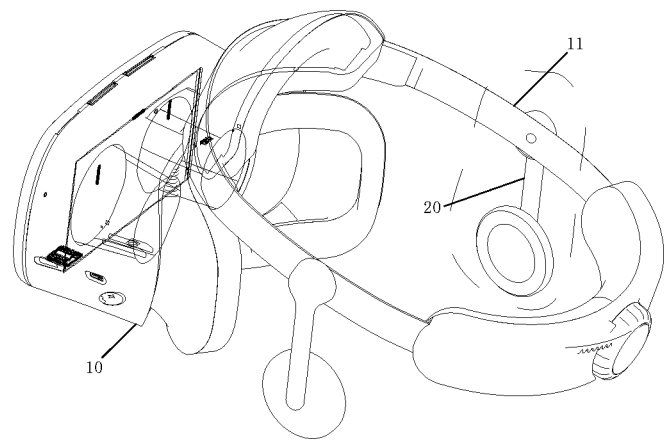

FIG. 1 is a structural diagram of a connecting mechanism according to embodiment 1 of the present application, as shown in FIG. 1. The embodiment of the present application provides a connecting mechanism, comprising: a body 10 and a detachable part 20 connected with the body 10. Where, the body 10 comprises a casing 11 and a sliding component 30, and the casing 11 is provided with an insertion hole 12 for insertion of the detachable part 20. There are many ways to implement the sliding component 30, and the implementation thereof may refer to FIG. 2, FIG. 11 or FIG. 21. The implementation of the insertion hole 12 may refer to FIG. 2, FIG. 10 or FIG. 21. Specific implementation ways of the sliding component 30 and the insertion hole 12 can be found in embodiments 2 to 4.

The sliding component 30 is slidably connected to the casing 11, and the sliding component 30 is provided with an access hole 31 and a clamping hole 32 which communicates with the access hole 31. There are many ways to implement the access hole 31 and the clamping hole 32, and the implementation thereof may refer to FIG. 3, FIG. 11 or FIG. 21. Specific implementation of the access hole 31 and the clamping hole 32 can be found in embodiments 2 to 4.

The detachable part 20 comprises an insertion piece 21. There are many ways to implement the insertion piece 21, and the implementation thereof may refer to FIG. 2, FIG. 14 or FIG. 21. Specific implementation ways of the insertion piece 21 can be found in embodiments 2 to 4. When the sliding component 30 slides from a first position to a second position, the access hole 31 is opposite to the insertion hole 12, and the insertion piece 21 of the detachable part 20 extends into the access hole 31 through the insertion hole 12. When the sliding component 30 slides from the second position to the first position, the insertion piece 21 of the detachable part 20 enters the clamping hole 32 from the access hole 31 so that the sliding component 30 locks the detachable part 20 through the clamping hole 32.

The technical solution provided by the embodiments of the present application realizes the dismounting between the detachable part 20 and the body through the operation of the sliding component 30. The operation is easy, the detachable part 20 can be replaced flexibly on the device, and no tool is needed, thereby greatly facilitating the mounting and dismounting of the detachable part 20 and satisfying different needs.

The mounting process is as described above, and the process of dismounting the detachable part 20 from the body is similar to the mounting process. The sliding component 30 slides from the first position to the second position, the insertion piece 21 of the detachable part 20 enters the access hole 31 through the clamping hole 32, the access hole 31 is opposite to the insertion hole 12, and then the detachable part 20 is pulled out, so that separation of the detachable part 20 from the body is completed. In the embodiments of the present application, an implementable way is that the casing 11 comprises an outer cover 13 and an inner cover 14. There are many ways to implement the outer cover 13 and the inner cover 14, and the implementations thereof may refer to FIG. 2 or FIG. 10. Specific implementations of the outer cover 13 and the inner cover 14 can be found in embodiments 2 to 3. A mounting cavity is enclosed by the outer cover 13 and the inner cover 14, and the sliding component 30 is disposed in the mounting cavity. The insertion hole 12 is formed in the outer cover 13. Another implementable way is to replace the inner cover 14 with a cover plate 45 which is used for covering the sliding component 30. One may refer to FIG. 21 for the implementation way of the cover plate 45. The specific implementation way of the cover plate 45 can be found in embodiment 4.

In the embodiments of the present application, there are many ways to connect the sliding component 30 with the detachable part 20, and the connection ways of the sliding component 30 and the detachable part 20 are described below.

Embodiment 2

Figure 2:
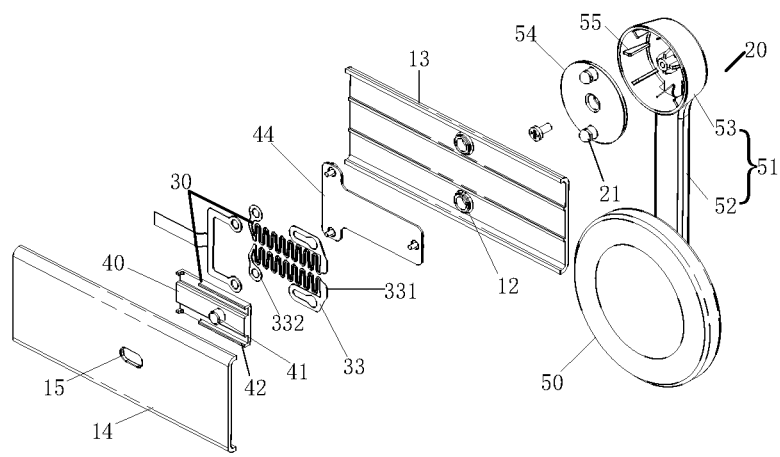
Figure 3:
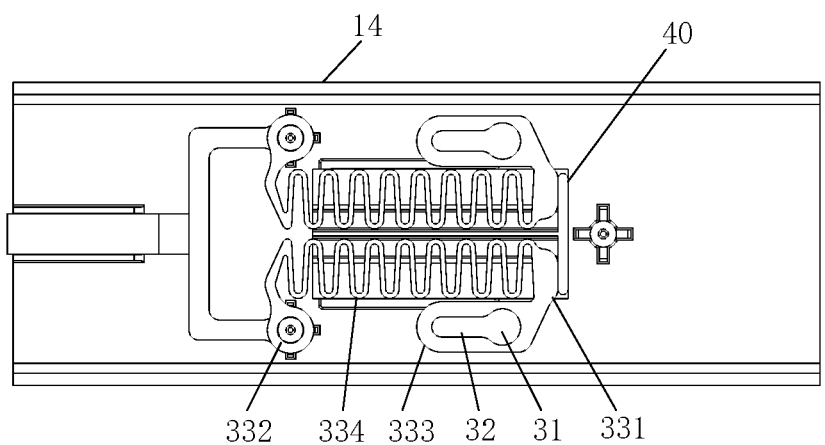

FIG. 2 is a partial exploded structural diagram of a connecting mechanism according to embodiment 2 of the present application, and FIG. 3 is a mounting structure diagram of a conductive plate type compression spring 33 according to the embodiment of the present application, as shown in FIGS. 1-3. Embodiment 2 is an implementation of the connecting mechanism based on embodiment 1, specifically, the embodiment of the present application provides a connecting mechanism, comprising the body and the detachable part 20 of the body. The body comprises the casing 11 and the sliding component 30, and the casing 11 is provided with the insertion hole 12 for insertion of the detachable part 20. The sliding component 30 comprises a sliding part and conductive plate type compression springs 33. The sliding component is slidably connected to the casing 11. The conductive plate type compression spring 33 comprises a free end 331 and a fixed end 332, wherein the free end 331 is in linkage with the sliding part, and the fixed end 332 is fixed on the casing 11. A conductive connecting end 333 extends from the free end 331 of the conductive plate type compression spring 33, wherein the conductive connecting end 333 is provided with the access hole 31 and the clamping hole 32 which communicates with the access hole 31.

Under the action of an external force, the sliding part slides from a first position to a second position, each access hole 31 is opposite to the insertion hole 12, and insertion pieces 21 of the detachable part 20 extend into the access holes 31 through the insertion hole 12. When the external force disappears, the sliding part slides from the second position to the first position under the restoring force of the conductive plate type compression springs 33, and the insertion pieces 21 of the detachable part 20 enter the clamping holes 32 through the access holes 31 and contact with the conductive connecting ends 333, so that the detachable part 20 is electrically connected with the conductive plate type compression springs 33. It should be noted that the casing 11 is further provided with a circuit board, and the circuit board is connected with both the body and the fixed end 332 of each conductive plate type compression spring 33, so as to realize the electrical connection between the conductive plate type compression springs 33 and the body.

The mounting process is as described above, and the process of dismounting the detachable part 20 from the body is similar to the mounting process, no further explanation here. The electrical connection between the detachable part 20 and the body is achieved through the insertion pieces 21, the conductive plate type compression springs 33 and the circuit board. No connecting wire of the detachable part 20 is exposed to the outside, so that the structure of the entire connecting mechanism is simplified.

The connecting mechanism provided in the embodiment of the present application is further described in detail below.

Figure 4:
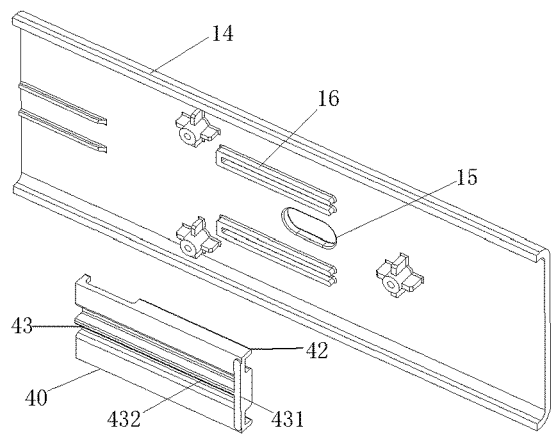

Referring to FIG. 2 and FIG. 4, the sliding part comprises a sliding plate 40, a shifting pillar 41 disposed on the sliding plate 40, and sliding protrusions 42. Specifically, the inner cover 14 of the casing 11 is provided with a shifting hole 15 and sliding grooves 16 for use with the sliding protrusions 42. The shifting pillar 41 extends into the shifting hole 15, and the sliding protrusions 42 are disposed in the sliding grooves 16, so that the sliding plate 40 and the inner cover 14 are slidably connected.

There are many ways to connect the inner cover 14 with the outer cover 13. In the embodiment of the present application, one implementation is that the inner cover 14 and the outer cover 13 are fixed together by ultrasonic welding. The insertion hole 12 is formed in the outer cover 13. The detachable part 20 can be connected with the sliding component 30 through the insertion hole 12.

The sliding protrusions 42 and the shifting pillar 41 are disposed on the side, facing the inner cover 14, of the sliding plate 40. One implementation is that two sliding protrusions 42 are symmetrically disposed on both sides of the shifting pillar 41. Correspondingly, there are two sliding grooves 16, the sliding protrusions 42 are disposed inside the sliding grooves 16, and the sliding protrusions 42 can slide in the sliding grooves 16. The position of the shifting hole 15 corresponds to the position of the shifting pillar 41. The shifting pillar 41 extends into the shifting hole 15, and the shifting pillar 41 can slide in the shifting hole 15. In use, an external force is applied to the shifting pillar 41 to make the shifting pillar 41 slide in the shifting hole 15, and the shifting pillar 41 drives the sliding plate 40, so that the sliding plate 40 slides in the sliding grooves 16 through the sliding protrusions 42.

Figure 5:
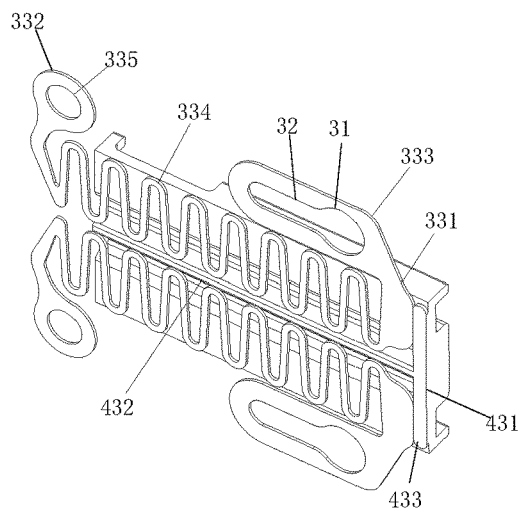

Referring to FIG. 3 and FIG. 5, in the embodiment of the present application, there are two conductive plate type compression springs 33 for being connected with the positive and negative electrodes of an electrical signal during electrical connection. The surface of each conductive plate type compression spring 33 is plated with metal, for example, the surface of each conductive plate type compression spring 33 is plated with copper, and copper plating can make the conductive plate type compression spring 33 more wear-resistant and less prone to rust, and can enhance conductivity. Each conductive plate type compression spring 33 comprises two parallel expandable wave springs 334. One end of each expandable wave spring 334 is a fixed end 332, and the other end is a free end 331. When the free end 331 of each conductive plate type compression spring 33 is in linkage with the sliding part, the conductive plate type compression spring 33 provides a restoring force through the expandable wave springs 334.

Each fixed end 332 is provided with a connecting hole 335 through which a screw passes to fix the fixed end 332 on the inner cover 14. Specifically, the circuit board comprises a main board and two conductive terminals. The two conductive terminals of the circuit board are provided with through holes corresponding to the connecting holes 335. The inner cover 14 is provided with a mounting groove, the main board of the circuit board is stuck into the mounting groove of the inner cover 14, and the two conductive terminals are connected with the fixed ends 332 of the two conductive plate type compression springs 33 respectively. The two conductive terminals are pressed by the conductive plate type compression springs 33, and the surfaces of the portions, making contact with the conductive plate type compression springs 33, of the two conductive terminals of the circuit board are covered with exposed copper, so that positive and negative signals from the circuit board can be transmitted to the conductive plate type compression springs 33. Due to the fact that electric conduction is realized through direct contact between the conductive plate type compression springs 33 and the exposed copper on the circuit board, electrical connection components can be saved and design space can be reduced. Each screw is connected to the inner cover 14 after passing through the connecting hole 335 formed in the corresponding fixed end 332 and the through hole formed in the corresponding conductive terminal, so that the fixed ends 332 of the conductive plate type compression springs 33 and the conductive terminals of the circuit board are fixed.

In order to allow the insertion pieces 21 of earphones to enter the clamping holes 32 from the access holes 31 more smoothly and avoid obstruction when the free ends 331 of the conductive plate type compression springs 33 are in linkage with the sliding part, the lengthwise direction of the clamping holes 32 in the conductive connecting ends 333 extending from the free ends 331 is parallel to the expansion direction of the expandable wave springs 334.

Referring to FIG. 4 and FIG. 5, the sliding plate 40 comprises a first plate surface and a second plate surface opposite to the first plate surface. The first plate surface is provided thereon with the shifting pillar 41 and the sliding protrusions 42. In the embodiment of the present application, there are two conductive plate type compression springs 33. In order to prevent contact of the two conductive plate type compression springs 33 to cause a short circuit, the second plate surface is provided with a T-shaped baffle

43, the T-shaped baffle 43 comprises a side plate 431 and a partition plate 432, the T-shaped baffle 43 divides the second plate surface into two regions of mirror symmetry, an expandable wave spring 334 is disposed in each region, the partition plate 432 separates the two parallel expandable wave springs 334, and the free ends 331 of the two expandable wave springs 334 abut against the side plate 431.

In specific implementation, when the sliding part slides under the action of an external force, the free end 331 of each conductive plate type compression spring 33 is pushed by the side plate 431 to move, and when the external force disappears, the free end 331 of each conductive plate type compression spring 33 pushes the side plate 431 and drives the sliding part to move. Since the two conductive plate type compression springs 33 are separated by the partition plate 432, a short circuit between the positive and negative electrodes does not occur.

Still referring to FIG. 5, in order to ensure that the free ends 331 do not disengage from the side plate 431 during the expansion and contraction of the conductive plate type compression springs 33, a limiting part 433 is disposed on the side plate 431, the limiting part 433 is parallel to the second plate surface so as to form a limiting groove with the side plate 431, and the free ends 331 of the two expandable wave springs 334 are located in the limiting groove.

Figure 6:
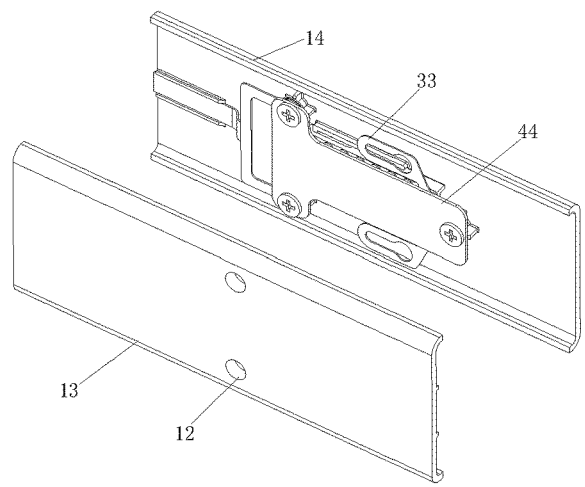

Referring to FIG. 2 and FIG. 6, a fixed plate 44 is further arranged. The fixed plate 44 is connected with the inner cover 14, and the sliding part and the conductive plate type compression springs 33 are sandwiched between the fixed plate 44 and the inner cover 14. The conductive plate type compression springs 33 are covered with the fixed plate 44 and the fixed plate 44 is fixedly connected to the inner cover 14 with screws. At the moment, the sliding part and the conductive plate type compression springs 33 are sandwiched between the fixed plate 44 and the inner cover 14. The fixed plate 44 can, but is not limited to, be made of a POM (polyformaldehyde) material. The surface of the POM material is smooth and wear-resistant, so that the conductive plate type compression springs 33 can slide smoothly. One implementation is that the fixed plate 44 is of T type, and comprises a duplex plate and a single plate. The fixed plate 44 fixes the fixed ends 332 of the two expandable wave springs 334 to the inner cover 14 through the duplex plate, and the single plate is located between the two conductive connecting ends 333 and connected with the inner cover 14.

Figure 7:
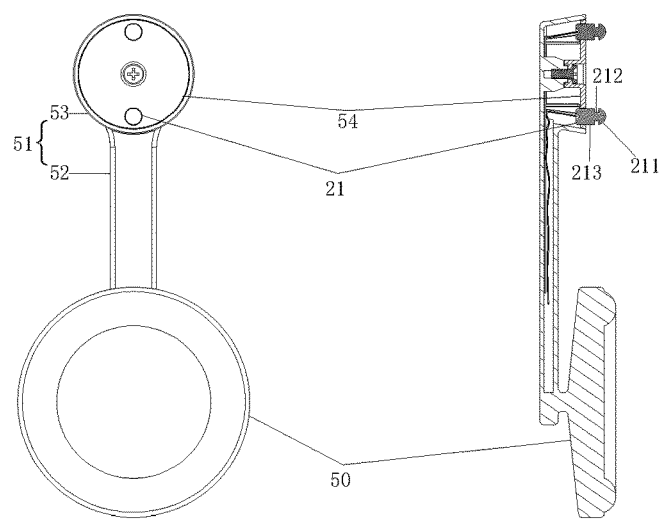

In the embodiment of the present application, the body comprises, but is not limited to, a head-mounted display in a head-mounted VR (Virtual Reality) device/AR (Augmented Reality) device. The detachable part 20 comprises earphones and/or a microphone. Specific details will be given below by taking the detachable part 20 as earphones. FIG. 7 is a structural diagram of the detachable part 20 according to the embodiment of the present application, as shown in FIG. 7.

Figure 8:
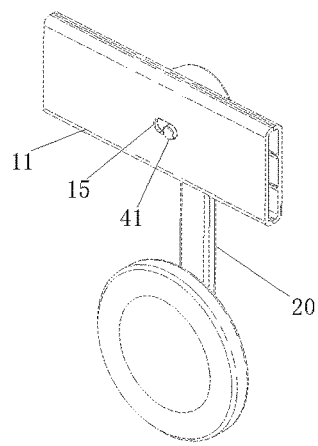

The detachable part 20 is earphones comprising receivers 50 and a support 51. A connecting wire of each receiver 50 stretches into the support 51 from the bottom end of the support 51, and then is led out of the top end of the support 51 after penetrating through the support 51. The insertion pieces 21 are disposed at the top end of the support 51. The insertion pieces 21 are connected with the connecting wires. The surface of each insertion piece 21 is plated with metal, such as copper. Copper plating can make the insertion pieces 21 more wear-resistant and less prone to rust, and can enhance conductivity. The earphones are connected with the body through the insertion pieces 21, and the earphones are electrically connected with the circuit board through the conductive plate type compression springs 33. See FIG. 8 for a schematic diagram after mounting.

The earphones provided in the embodiment of the present application will be further described in detail below.

Referring to FIG. 2 and FIG. 7, the support 51 comprises a strut portion 52, connecting portions 53 provided with receiving cavities and disposed at the ends of the strut portion 52, and sealing covers 54. The connecting wires penetrate through the strut portion 52 into the receiving cavities of the connecting portions 53. Each sealing cover 54 is provided with a fixing hole, and the insertion pieces 21 are mounted in the fixing holes. Each sealing cover 54 is disposed at an opening of the corresponding connecting portion 53 so as to seal the corresponding receiving cavity. One implementation is that the insertion pieces 21 and the sealing covers 54 are integrally connected by means of insert injection molding, and positive and negative lead wires of the earphones are welded to the two insertion pieces 21 respectively. A through hole is formed in the center of each sealing cover 54. The sealing covers 54 are fixed to the connecting portions 53 by screws. Moreover, the sealing covers 54 can be rotated relative to the connecting portions 53 so as to adjust the angle of the earphones with respect to the casing 11. In order to enable the earphones to be fixed at the adjusted angle after adjustment, in the embodiment of the present application, optionally, a plurality of limiting plates 55 for adjustment are disposed on the cavity wall of the receiving cavity of each connecting portion 53. After the connecting portions 53 rotate relative to the sealing covers 54, the connecting portions 53 can be fixed in the rotated position by the limiting plates 55 so as to adjust the angle of the earphones with respect to the casing 11.

Figure 9:
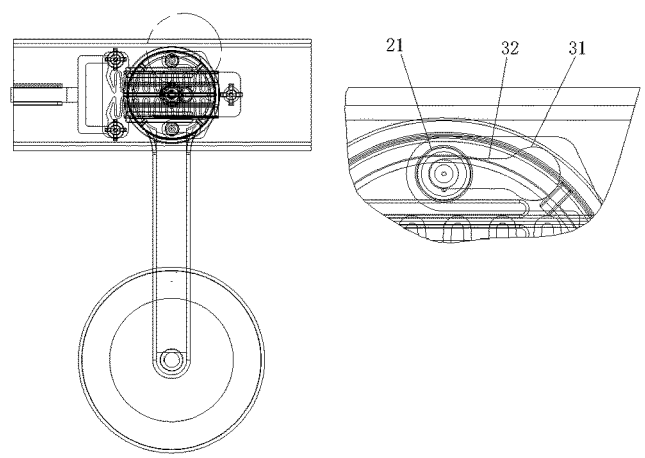

Referring to FIG. 7 and FIG. 9, in the embodiment of the present application, each insertion piece 21 comprises a first clamping portion 211, a second clamping portion 212, and a third clamping portion 213 which are coaxially connected. The third clamping portions 213 are connected with the connecting wires of the receivers 50. When the earphones are connected with the body through the insertion pieces 21, the sliding part slides from the first position to the second position, the access holes 31 are opposite to the insertion hole 12, and the first clamping portions 211 pass through the insertion hole 12 and the access holes 31, and the second clamping portions 212 also stretch into the access holes 31 through the insertion hole 12. By withdrawing the external force, the sliding part slides from the second position to the first position under the restoring force of the conductive plate type compression springs 33. At the moment, each insertion piece makes the first clamping portion 211 pass through the corresponding access hole 31 and enters the corresponding clamping hole 32 through the second clamping portion 212, and the first clamping portion 211 and the third clamping portion 213 limit the axial movement of the insertion piece 21 along the insertion piece 21 within the clamping hole 32. The insertion pieces 21 of the earphones are in contact with the conductive connecting ends 333. At the moment, mounting is completed, and the earphones are electrically connected with the circuit board through the insertion pieces 21 and the conductive plate type compression springs 33.

It should be noted that when the detachable part 20 is a microphone, the receivers 50 in the earphones can be changed to a transmitter. Specifically, the microphone comprises a transmitter and a support 51. The structures of the microphone and the earphones are the same except for the structures of the receivers 50 and the transmitter.

In the technical solution provided in embodiment 2 of the present application, the mounting and dismounting of the detachable part 20 and the body are realized through the operation of the sliding component 30. The conductive plate type compression springs 33 can realize both the spring function and the conductive performance, and the connection of the insertion pieces is realized through the conductive plate type compression springs 33, including mechanical connection and electrical connection. No connecting wire of the detachable part 20 is exposed to the outside, so that the structure of the entire connecting mechanism is simplified. The insertion pieces can be used for electrical conduction, and can also be used for fixing the detachable part 20 on the body, which saves electrical connection components. The angle of the detachable part 20 can be easily adjusted with respect to the body, so as to facilitate wearing and adjustment for users.

Embodiment 3

Figure 10:
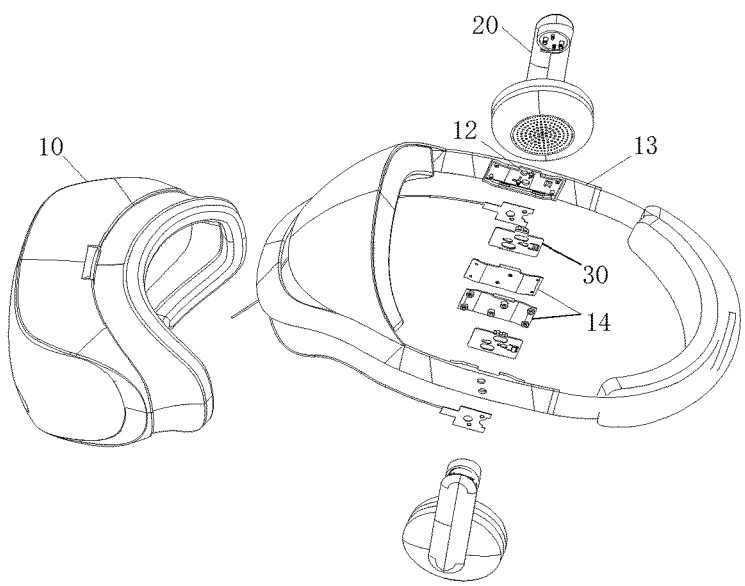
Figure 11:
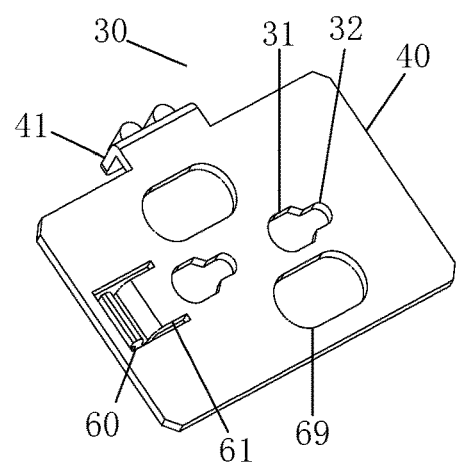

FIG. 10 is an exploded structural diagram of a connecting mechanism according to embodiment 3 of the present application, FIG. 11 is a structural diagram of a sliding component 30 according to embodiment 3 of the present application, and FIG. 12 is a structural diagram of an outer cover 13 according to embodiment 3 of the present application, as shown in FIG. 1 and FIGS. 10-12. Embodiment 3 is another implementation of the connecting mechanism based on embodiment 1. Specifically, the sliding component 30 is provided with a spring plate 61 with a protruding structure 60. The casing 11 is provided with a locking groove 62 and a releasing groove 63. The sliding component 30 slides from the first position to the second position, and the sliding component 30 drives the spring plate 61 to stretch into the releasing groove 63 through the protruding structure 60. The sliding component 30 slides from the second position to the first position, the sliding component 30 drives the spring plate 61 to stretch into the locking groove 62 through the protruding structure 60, and the movement of the sliding component 30 can be limited by the locking groove 62. The state when the spring plate 61 enters the locking groove 62 through the protruding structure 60 is shown in FIG. 13.

The sliding component 30 can be locked at the first position or the second position by entering the locking groove 62 and the releasing groove 63 through the protruding structure 60 on the spring plate 61, the situation that the sliding component 30 moves back and forth to affect the connection stability between the detachable part 20 and the body is prevented, meanwhile, a prompt effect is realized, for example, when the protruding structure 60 of the spring plate 61 enters or disengages from the locking groove 62 or the releasing groove 63, there will be a "click" sound, and the user will also feel "click" when pushing the sliding component 30, meaning that the spring plate 61 of the sliding component 30 has entered/disengaged from the locking groove 62/the releasing groove 63 through the protruding structure 60. After the protruding structure 60 of spring plate 61 enters the locking groove 62/the releasing groove 63, the locking groove 62/the releasing groove 63 can limit the movement of the protruding structure 60, and without the action of an external force, the protruding structure 60 can not disengage from the locking groove 62/the releasing groove 63. Meanwhile, in order to ensure that the protruding structure 60 of the spring plate 61 smoothly enters/disengages from the locking groove 62/the releasing groove 63, and reduce the frictional force between the protruding structure 60 and the locking groove 62/the releasing groove 63, the contact surface between the locking groove 62/the releasing groove 63 and the protruding structure 60 is a smooth curved surface.

In the embodiment of the present application, after the connection between the detachable part 20 and the body is completed, electrical connection may also be achieved. One implementation is that, referring to FIG. 10, the sliding component 30 further comprises an electrical connector which is connected with the body. The electrical connector is provided with two hole-shaped electrical connection portions. The surface of the contact portion of each electrical connection portion is covered with exposed copper. The two electrical connection portions are connected with the positive electrode and the negative electrode of an electrical signal respectively. The surface of each insertion piece 21 of the detachable part 20 is plated with metal, such as copper. The insertion pieces 21 of the detachable part 20 are in contact with the electrical connection portions when passing through the electrical connection portions. In this way, positive and negative signals from the body can be transmitted to the detachable part 20.

Another implementation to achieve electrical connection is, referring to FIGS. 10-12 and FIG. 14, the casing 11 is further provided with an electrical connection hole 64. The insertion pieces 21 of the detachable part 20 include a locking insertion piece 65 and a conductive insertion piece 66. The sliding component 30 slides from the first position to the second position, the access hole 31 is opposite to the insertion hole 12, the locking insertion piece 65 extends into the access hole 31 through the insertion hole 12, and the conductive insertion piece 66 extends into the electrical connection hole 64 and is connected with the electrical connector. In the embodiment of the present application, the conductive insertion piece 66 comprises but is not limited to: Pogo pin. Pogo pin is a spring-type probe formed by three basic components, a pin spindle, a spring and a pin tube through riveting and pre-compaction with a precise instrument, and a precise spring structure is disposed inside. When the conductive insertion piece 66 is connected with the electrical connector, the conductive insertion piece makes contact with the electrical connector through the pin spindle.

The sliding component 30 slides from the second position to the first position, and the locking insertion piece 65 enters the clamping hole 32 from the access hole 31. The position of the locking insertion piece 65 is locked after the locking insertion piece 65 enters the clamping hole 32. One implementation is that, referring to FIG. 15, the locking insertion piece 65 comprises a first clamping portion 211, a second clamping portion 212 and a third clamping portion 213 which are coaxially connected to each other. Specific features can be found in embodiment 2. The features of the corresponding parts in embodiment 2 and the features in embodiment 3 can be referred to each other, which will not be described here.

Referring to FIG. 11 and FIG. 12, in the embodiment of the present application, the sliding component 30 further comprises a sliding plate 40 and a shifting pillar 41 disposed on the sliding plate 40. The casing 11 is provided with a shifting hole 15 and sliding grooves 16 for use with the sliding plate 40. The shifting pillar 41 penetrates through the shifting hole 15 and stretches out, and the sliding plate 40 and the casing 11 are slidably connected to each other through the sliding grooves 16. Specifically, the shifting pillar 41 is disposed on the side wall of the sliding plate 40. Two sliding grooves 16 are formed in the corresponding positions of two side walls, opposite to the sliding plate 40, of the casing 11 respectively. The sliding plate 40 enters the sliding grooves 16 through the side walls, and the sliding plate 40 can slide within the sliding grooves 16. The shifting hole 15 is formed in the position, corresponding to the shifting pillar 41, of the casing 11, and the shifting pillar 41 can slide within the shifting hole 15. In use, an external force is applied to the shifting pillar 41 to make the shifting pillar slide in the shifting hole 15, and the shifting pillar 41 drives the sliding plate 40 to move, so that the sliding plate 40 slides in the sliding grooves 16 through the side walls.

One implementation is that the shifting pillar 41 comprises a supporting portion and an operating portion. The shifting pillar 41 is connected with the sliding plate 40 through the supporting portion. The operating portion extends out of the shifting hole 15 and is bent towards the detachable part 20 so as to be parallel to the plane where the shifting hole 15 is located. Due to the fact that the operating portion is parallel to the plane where the shifting hole 15 is located, a user can use the shifting pillar 41 more conveniently, and the structure of the sliding component 30 and the casing 11 is more compact; meanwhile, the operating portion is provided with a non-slip structure, which makes operation more convenient.

Referring to FIG. 10, FIG. 12 and FIG. 16, in the embodiment of the present application, the outer cover 13 is provided with the insertion hole 12, the electrical connection hole 64, the shifting hole 15 and the sliding grooves 16 for use with the sliding plate 40. The electrical connector is disposed between the sliding plate 40 and the outer cover 13. The locking groove 62/the releasing groove 63 may be disposed on the outer cover 13 or the inner cover 14, depending on the protruding direction of the protruding structure 60 on the spring plate 61. The direction of the protruding structure 60 decides the position of the locking groove 62/the releasing groove 63.

In order to make the structure of the sliding component 30 more compact, the outer cover 13 is provided with a mounting groove, the sliding component 30 is disposed in the mounting groove, and the inner cover 14 covers the mounting groove. The mounting groove can increase the depth of the mounting cavity, make the structure of the sliding component 30 compact, and allow the connection between the detachable part 20 and the sliding component 30 to be more firm and stable.

In the embodiment of the present application, besides ultrasonic welding, the connection ways of the inner cover 14 and the outer cover 13 also include, still referring to FIG. 12 and FIG. 16, the outer cover 13 is provided with a first positioning pillar 67 and the inner cover 14 is provided with a second positioning pillar 68. The sliding component 30 is provided with an oblong positioning hole 69, and the electrical connector is provided with a mounting hole. The second positioning pillar 68 extends into the oblong positioning hole 69 and is sleeved with the first positioning pillar 67 passing through the mounting hole and the oblong positioning hole 69 in sequence. Through the first positioning pillar 67 and the second positioning pillar 68, the outer cover 13 and the inner cover 14 are connected, and the sliding component 30 and the electrical connector can be positioned by the first positioning pillar 67 and the second positioning pillar 68, so that the movement of the electrical connector can be prevented. Under the combined effect of the oblong positioning hole 69, the first positioning pillar 67, and the second positioning pillar 68, the sliding component 30 can only move in a certain direction.

The following describes in detail how to mount and dismount the detachable part 20 and the body.

During mounting, referring to FIG. 17, the sliding component 30 is first slid from the first position to the second position under an external force, the access hole 31 is opposite to the insertion hole 12, the locking insertion piece 65 of the detachable part 20 is made to stretch into the access hole 31 through the insertion hole 12, at the moment, the conductive insertion piece 66 is connected with the electrical connector, and the protruding structure 60 of the spring plate 61 enters the releasing groove 63. The sliding component 30 slides from the second position to the first position in the direction of the arrow in the figure, the locking insertion piece 65 enters the clamping hole 32 from the access hole 31, the clamping hole 32 locks the locking insertion piece 65, and the protruding structure 60 of the spring plate 61 enters the locking groove 62 to complete the mounting process.

During dismounting, referring to FIG. 18, the sliding component 30 first slides under an external force from the first position to the second position in the direction of the arrow in the figure, the locking insertion piece 65 enters the access hole 31 from the clamping hole 32, the access hole 31 is opposite to the insertion hole 12, and the locking insertion piece 65 is pulled out to separate the conductive insertion piece 66 from the electrical connector to complete the dismounting process.

The features of the corresponding parts in embodiment 3 and the features in embodiment 2 can be referred to each other, which will not be described here.

In the technical solution provided in embodiment 3 of the present application, the dismounting of the detachable part 20 and the body is realized through the operation of the sliding component 30. The insertion pieces 21 can achieve both mechanical connection and electrical connection, and no connecting wire of the detachable part 20 is exposed to the outside. The sliding component 30 is elastic itself, eliminating the need for a spring component. The angle of the detachable part 20 can be easily adjusted with respect to the body, so as to facilitate wearing and adjustment for users.

Embodiment 4

Embodiment 4 is another embodiment of the connecting mechanism based on embodiment 1. Specifically, referring to FIGS. 19-22 and FIGS. 24-26, a connecting mechanism is used to connect a component A to another component B, and comprises the casing 11 and the detachable part 20, the detachable part 20 is provided with a buckling part 70, and the locking insertion piece 65 and the conductive insertion piece 66 are disposed on the buckling part 70. The sliding component 30 comprises the shifting pillar 41 and the sliding plate 40. The sliding plate 40 is provided with the access hole 31, the clamping hole 32, and the through hole through which the conductive insertion piece 66 passes. The sliding plate 40 and the shifting pillar 41 are integrally and fixedly connected.

When the shifting pillar 41 is pressed, the access hole 31 is opposite to the insertion hole 12, the locking insertion piece 65 of the detachable part 20 extends into the access hole 31 through the insertion hole 12, and the conductive insertion piece 66 extends into the electrical connection hole 64 and is connected with the electrical connector. When the pressing force disappears, the locking insertion piece 65 of the detachable part 20 enters the clamping hole 32 from the access hole 31 so that the sliding component 30 locks the detachable part 20 through the clamping hole 32. Simply speaking, when the shifting pillar 41 is pressed, the sliding plate 40 moves along with the shifting pillar 41 to disengage the locking insertion piece 65 or clamp the clamping hole 32, so that the component A is removed from the component B or connected to the component B. FIGS. 19-22 and FIGS. 24-26 show the application of the connecting mechanism to the VR device, the detachable part 20 is an earphone monomer, the casing 11 is disposed on a head-mounted support, and the earphone monomer can be mounted on and dismounted from the head-mounted support easily. FIG. 19 and FIG. 20 show the normal mounting state of the earphone monomer on the head-mounted support, and the condition after the earphone monomer is detached from the head-mounted support is shown in FIG. 26.

By operating the shifting pillar 41, the locking insertion piece 65 on the buckling part 70 and the clamping hole 32 in the sliding plate 40 are engaged or disengaged, so that connection and disconnection between the detachable part 20 and the casing 11 are realized, correspondingly, connection and detachment of individual components connected by the connecting mechanism are realized, one-touch operation is realized, no additional tool is needed, and operation is easy and quick.

Further, referring to FIG. 23, to guide the movement of the sliding plate 40, guide wings 71 are disposed at the edges of the sliding plate, the sliding grooves 16 are correspondingly formed in the casing 11, and the guide wings 71 are embedded in the sliding grooves 16 correspondingly. Then, when the sliding plate 40 moves under the pressing of the shifting pillar 41, movement guidance is realized through the cooperation of the guide wings 71 and the sliding grooves 16, so that the movement of the sliding plate 40 is stable and reliable, and shaking is avoided, which is advantageous for alignment and cooperation of the locking insertion piece 65 and the clamping hole 32.

As shown in FIG. 22 and FIG. 23, the shifting pillar 41 comprises a button body 72 and an elastic restoration part 73 which restores the button body 72, and the button body 72 comprises a pressing portion 721 and a limiting portion 722 which are integrally fixed. In the present embodiment, the limiting portion 722 is located below the pressing portion 721; A groove 74 is formed on one side of the casing 11, the shifting hole 15 is formed in the top wall of the groove 74, the pressing portion 721 penetrates through the shifting hole 15, and the top end of the pressing portion 721 protrudes from the shifting hole 15, so that the pressing portion 721 serves as a pressing operation portion of the shifting pillar 41 to facilitate the operation.

The limiting portion 722 abuts against the inner side of the top wall of the groove 74, that is, the top wall of the groove 74 limits the upward movement of the shifting pillar 41 to prevent the shifting pillar from disengaging from the casing 11; The sliding plate 40 is located in the groove 74 and is fixedly connected to the lower side of the limiting portion 722, so that the sliding plate 40 is fixedly connected to the shifting pillar 41 and moves under the pressing of the shifting pillar 41, specifically, a connecting plate is formed on the bottom surface of the limiting portion 722, and the connecting plate and the top end of the sliding plate 40 are connected by screws, as shown in FIG. 22. Due to the fact that the sliding plate 40 is located in the groove 74 in the casing 11, in order to allow the locking insertion piece 65 to be matched with a clamping groove, the insertion hole 12 allowing the locking insertion piece 65 to pass through is correspondingly formed in the casing 11, as shown in FIG. 21.

In addition, due to the limited thickness of the casing 11, the pressing portion 721 and the limiting portion 722 are both elongated and are located at the top surface of the casing 11. In the present embodiment, the shifting pillar 41 has both the pressing function and the restricting function, and there is no need to additionally arrange a limiting portion 722. The structure is simple and easy to install. Of course, the shifting pillar 41 can also adopt other shifting pillar structures in the prior art, which may not be specifically limited.

In order to facilitate the installation of the elastic restoration part 73, in the present embodiment, an elastic restoration part accommodating groove 75 is further formed in the groove 74. The bottom end of the elastic restoration part 73 is embedded in the elastic restoration part accommodating groove 75, and the top end thereof abuts against the bottom surface of the limiting portion 722. The elastic restoration part 73 can be a spring, a silicone part and the like, is elastic itself, and can be squeezed into the elastic restoration part accommodating groove 75 through its own elastic deformation. Preferably two elastic restoration parts are disposed at the bottom of the limiting portion 722 to enhance restoration reliability.

Further, a guide pillar 77 is disposed on the bottom surface of the limiting portion 722, the elastic restoration part 73 is preferably a spring and is arranged on the guide pillar 77 in a sleeving mode, the guide pillar 77 can be integrally formed with the limiting portion 722 and the pressing portion 721. By arranging the guide pillar 77, on one hand, the compression and restoration of the elastic restoration part 73 are guided, and on the other hand, the restoration reliability of the elastic restoration part 73 is enhanced, and the pressing reliability of the shifting pillar 41 is further improved.

In order to ensure that the elastic restoration part 73 is installed reliably, a silicone sleeve 76 is embedded in the elastic restoration part accommodating groove 75, and the bottom end of the elastic restoration part 73 is placed in the silicone sleeve 76. The silicone sleeve 76 is fixed by interference, that is, the silicone sleeve is squeezed into the elastic restoration part accommodating groove 75 through its own elastic deformation, and fixation is simple and reliable. The bottom end of the elastic restoration part 73 is embedded in the silicone sleeve 76 and can be further bonded by strong glue to improve stability.

To lock the position of the locking insertion piece 65 after the locking insertion piece 65 enters the clamping hole 32, one implementation is, referring to FIG. 7 or FIG. 15, the locking insertion piece 65 comprises a first clamping portion 211, a second clamping portion and a third clamping portion 213 which are coaxially connected to each other. Specific features can be found in embodiment 2 and embodiment 3. The features of the corresponding parts in embodiment 4 and the features in embodiment 2 and embodiment 3 can be referred to each other, which will not be described here.

Another implementation is, as shown in FIGS. 21-23, the access hole 31 and the clamping hole 32 form an inverted L-shaped clamping groove, that is, the inverted L-shaped clamping groove comprises an upper wide groove body and a lower narrow groove body, and the locking insertion piece 65 is an L-shaped buckle perpendicular to the sliding plate 40. Specifically, the sliding plate 40 is affixed to the side face of the casing 11, and is located below the shifting pillar 41 in the present embodiment, and when the shifting pillar 41 conducts downward pressing and upward restoration, the sliding plate 40 moves up and down with the shifting pillar 41. In the normal installation state, the locking insertion piece 65 hooks the sliding plate 40 at the narrow groove body of the clamping groove to achieve clamping. When the sliding plate 40 moves downward under the downward pressing of the shifting pillar 41, the upper wide groove body thereof is made to correspond to the locking insertion piece 65, the clamping relation between the locking insertion piece 65 and the clamping groove is lost, and then the detachable part 20 can be pulled out to achieve detachment. By the adoption of the clamping groove and the locking insertion piece 65 of the structures, clamping and detachment can be easily achieved when the sliding plate 40 moves up and down with the shifting pillar 41, so that the dismounting of the detachable part 20 can be achieved conveniently.

For the realization of the function of the detachable part 20, the conductive insertion piece 66 is further disposed on the buckling part 70. The conductive insertion piece 66 comprises a spring pin mounting portion 78 and a spring pin 79 mounted on the spring pin mounting portion 78. Specifically, the sliding plate 40 is correspondingly provided with a through hole through which the spring pin 79 passes. The casing 11 is correspondingly provided with an electrical connector and an electrical connection hole 64 through which the spring pin 79 passes. The electrical connector is provided with an exposed copper area, and the spring pin 79 is in contact with the exposed copper area for electrification so as to realize the function of the detachable part 20.

For the mounting of the buckling part 70 on the detachable part 20, specifically, a positioning plate 80 is fixedly disposed on the detachable part 20. The positioning plate 80 locates the buckling part 70 in the detachable part 20. The positioning plate 80 is provided with a hollowed-out portion 81 for avoiding the locking insertion piece 65 and the conductive insertion piece 66. The mounting process is to press the spring pin 79 into the spring pin mounting portion 78 through a tool, then mount the buckling part 70 into the detachable part 20, and finally fix the positioning plate 80 on the detachable part 20 by the screw.

In addition, a cover plate 45 is further disposed on the casing 11, as shown in FIG. 20 and FIG. 21, to be used for covering the sliding plate 40 and the electrical connector to ensure safety of use. The cover plate 45 can be buckled onto the casing 11 through a buckle.

In this embodiment, the host may be a host of a VR device, the casing 11 is located on a head-mounted support, and specifically is a part of the head-mounted support, integrally formed with the head-mounted support, or a separate component, and the detachable part 20 is an earphone monomer or microphone monomer. Taking the earphone monomer as an example, in the embodiment of the present application, the earphone monomer can move in three directions (ie, when the VR device is worn by the user, the earphone monomer can move forward and backward, upward and downward and leftward and rightward relative to the head of the user), and wearing comfort and versatility are realized, thus achieving easy disassembly on the premise that three-directional movement of the earphone monomer is realized.

The mounting and dismounting process of the earphone monomer of the present embodiment will be described in detail below. The mounting state of the earphone monomer on the head-mounted support is shown in FIG. 24, and the locking insertion pieces 65 on the buckling part 70 (in this embodiment, four locking insertion pieces 65 are disposed to improve clamping reliability) are clamped in the lower narrow groove body of the clamping groove in the sliding plate 40, so as to fix the earphone monomer; When the shifting pillar 41 is pressed down, the elastic restoration part 73 is compressed and the sliding plate 40 moves downwards under the guide of the sliding grooves 16 of the casing 11 until the locking insertion piece 65 is located in the upper wide groove body of the clamping groove. At the moment, the locking insertion piece 65 and the sliding plate 40 are disengaged, as shown in FIG. 25, the earphone monomer can be pulled out according to the existing state to achieve the dismounting of the earphone monomer, as shown in FIG. 26; When the earphone monomer is mounted, the shifting pillar 41 is pressed downward too to make the locking insertion piece 65 correspond to the upper wide groove body of the clamping groove, and the locking insertion piece 65 passes through the insertion hole 12 in the head-mounted support to make the hook portion enter the upper wide groove body of the clamping groove, at the moment, the shifting pillar 41 is released to restore, and the locking insertion piece 65 clamps the sliding plate 40 in the lower narrow groove body of the clamping groove, so as to realize mounting of the earphone monomer.

It should be noted that, although specific embodiments of the present application have been described in detail with reference to the accompanying drawings, they should not be construed as limiting the scope of protection of the present application. Various modifications and variations that can be made by those skilled in the art without creative labor within the scope described in the claims are still within the protection scope of the present application. The examples of the embodiments of the present application are intended to briefly describe the technical features of the embodiments of the present application, so that those skilled in the art can intuitively understand the technical features of the embodiments of the present application, and are not improperly limited by the embodiments of the present application.

The device embodiments described above are merely illustrative, wherein the units described as separate components may or may not be physically separate. Those of ordinary skill in the art can understand and implement without taking creative labor. The foregoing description shows and describes several preferred embodiments of the embodiments of the present application. However, as described above, it should be understood that the embodiments of the present application are not limited to the forms disclosed herein, and should not be taken as excluding other embodiments. Rather, it is capable of use in various other combinations, modifications, and environments and is capable of modification by the above teachings or by using the technology or knowledge of the relevant art within the conviction of the application described herein. Modifications and changes made by those skilled in the art without departing from the spirit and scope of the embodiments of the present application are all within the scope of the appended claims of the embodiments of the present application.

The invention claimed is:

1. A connecting mechanism, comprising:
   a body;
   and a detachable part connected with the body, wherein:
   the body includes a casing and a sliding component
   the casing is provided with an insertion hole for insertion of the detachable part, the sliding component is in sliding connection with the casing;
   the sliding component is provided thereon with access holes and clamping holes which communicate with the access holes; and the detachable part comprises insertion pieces;
   when the sliding component slides from a first position to a second position, the access holes are opposite to the insertion hole, and the insertion pieces of the detachable part extend into the access holes through the insertion hole; and when the sliding component slides from the second position to the first position, the insertion pieces of the detachable part enter the clamping holes from the access holes so that the sliding component locks the detachable part through the clamping holes.

2. The connecting mechanism according to claim 1, wherein the casing comprises an outer cover and an inner cover, a mounting cavity is defined by the outer cover and the inner cover, and the sliding component is disposed in the mounting cavity; the insertion hole is formed in the outer cover.

3. The connecting mechanism according to claim 2, wherein:

the sliding component comprises a sliding part and conductive plate type compression springs;

the sliding part is slidably connected to the casing; each conductive plate type compression spring comprises a free end and a fixed end, wherein the free end is in linkage with the sliding part, and the fixed end is fixed on the casing; a conductive connecting end extends from the free end of each conductive plate type compression spring, wherein the conductive connecting end is provided with the access hole and the clamping hole;

under the action of an external force, the sliding part slides from the first position to the second position, the conductive plate type compression springs are compressed, each access hole is opposite to the insertion hole, and the insertion pieces of the detachable part extend into the access holes through the insertion hole; and when the external force disappears, the sliding part slides from the second position to the first position under the restoring force of the conductive plate type compression springs, and the insertion pieces of the detachable part enter the clamping holes through the access holes and contact with the conductive connecting ends, so that the detachable part is electrically connected with the conductive plate type compression springs.

4. The connecting mechanism according to claim 3, wherein:

the sliding part comprises a sliding plate, a shifting pillar disposed on the sliding plate, and sliding protrusions; and the inner cover is provided with a shifting hole and sliding grooves for use with the sliding protrusions, the shifting pillar extends into the shifting hole, and the sliding protrusions are disposed in the sliding grooves, so that the sliding plate and the inner cover are slidably connected.

5. The connecting mechanism according to claim 4, wherein:

each conductive plate type compression spring comprises two parallel expandable wave springs, one end of each expandable wave spring is a fixed end, and the other end is a free end; and each fixed end is provided with a connecting hole through which a screw passes to fix the fixed end on the inner cover; the lengthwise direction of the clamping holes in the conductive connecting ends extending from the free ends is parallel to the expansion direction of the expandable wave springs.

6. The connecting mechanism according to claim 5, wherein:

the sliding plate comprises a first plate surface and a second plate surface opposite to the first plate surface;

the first plate surface is provided thereon with the shifting pillar and the sliding protrusions; the second plate surface is provided with a T-shaped baffle, the T-shaped baffle comprises a side plate and a partition plate, the T-shaped baffle divides the second plate surface into two regions of mirror symmetry, an expandable wave spring is disposed in each region, and the partition plate separates the two parallel expandable wave springs; and the free ends of the two expandable wave springs abut against the side plate.

7. The connecting mechanism according to claim 6, wherein:

the side plate is provided with a limiting portion; and the limiting portion is parallel to the second plate surface so as to form a limiting groove with the side plate; the free ends of the two expandable wave springs are located in the limiting groove.

8. The connecting mechanism according to claim 2, wherein:

the casing is further provided with an electrical connection hole; and the sliding component further comprises an electrical connector which is electrically connected with the body; the insertion pieces of the detachable part include a locking insertion piece and a conductive insertion piece.

9. The connecting mechanism according to claim 8, wherein:

the sliding component is provided with a spring plate with a protruding structure;

the casing is provided with a locking groove and a releasing groove;

the sliding component slides from the first position to the second position, and the sliding component drives the spring plate to stretch into the releasing groove through the protruding structure, the access hole is opposite to the insertion hole, the locking insertion piece extends into the access hole through the insertion hole, and the conductive insertion piece extends into the electrical connection hole and is connected with the electrical connector; and the sliding component slides from the second position to the first position, the locking insertion piece enters the clamping hole from the access hole, the sliding component drives the spring plate to stretch into the locking groove through the protruding structure, and the movement of the sliding component can be limited by the locking groove.

10. The connecting mechanism according to claim 9, wherein:

the sliding component further comprises a sliding plate and a shifting pillar disposed on the sliding plate; and the casing is provided with a shifting hole and sliding grooves for use with the sliding plate, the shifting pillar penetrates through the shifting hole and stretches out, and the sliding plate and the casing are slidably connected to each other through the sliding grooves.

11. The connecting mechanism according to claim 10, wherein:

the shifting pillar comprises a supporting portion and an operating portion; and the shifting pillar is connected with the sliding plate through the supporting portion, the operating portion extends out of the shifting hole and is bent towards the detachable part so as to be parallel to the plane where the shifting hole is located.

12. The connecting mechanism according to claim 9, wherein:
the outer cover is provided with a first positioning pillar and the inner cover is provided with a second positioning pillar;
the sliding component is provided with an oblong positioning hole, and the electrical connector is provided with a mounting hole; and
the second positioning pillar extends into the oblong positioning hole and is sleeved with the first positioning pillar passing through the mounting hole and the oblong positioning hole in sequence.

13. The connecting mechanism according to claim 8, wherein:
the detachable part is provided with a buckling part, and the locking insertion piece and the conductive insertion piece are disposed on the buckling part;
the sliding component comprises a shifting pillar and a sliding plate, the sliding plate is provided with the access hole, the clamping hole, and the through hole through which the conductive insertion piece passes, and the sliding plate and the shifting pillar are integrally and fixedly connected;
when the shifting pillar is pressed, the access hole is opposite to the insertion hole, the locking insertion piece of the detachable part extends into the access hole through the insertion hole, and the conductive insertion piece extends into the electrical connection hole and is connected with the electrical connector; and
when the pressing force disappears, the locking insertion piece of the detachable part enters the clamping hole from the access hole so that the sliding component locks the detachable part through the clamping hole.

14. The connecting mechanism according to claim 13, wherein guide wings are disposed at the edges of the sliding plate, sliding grooves are correspondingly formed in the casing, and the guide wings are embedded in the sliding grooves correspondingly.

15. The connecting mechanism according to claim 13, wherein:
the shifting pillar comprises a button body and an elastic restoration part which restores the button body, and the button body comprises a pressing portion and a limiting portion which are integrally and fixedly fixed; and
a groove is formed in one side of the casing, the shifting hole is formed in the top wall of the groove, the pressing portion penetrates through the shifting hole, the top end of the pressing portion protrudes from the shifting hole, the limiting portion abuts against the inner side of the top wall of the groove, and the sliding plate is located in the groove and is fixedly connected to the lower side of the limiting portion.

16. The connecting mechanism according to claim 15, wherein an elastic restoration part accommodating groove is further formed in the groove, a silicone sleeve is embedded in the elastic restoration part accommodating groove, the bottom end of the elastic restoration part is placed in the silicone sleeve, and the top end of the elastic restoration part abuts against the bottom surface of the limiting portion.

17. The connecting mechanism according to claim 16, wherein a guide pillar is disposed on the bottom surface of the limiting portion, and the elastic restoration part is a spring and is disposed on the guide pillar in a sleeving mode.

18. The connecting mechanism according to claim 15, wherein the access hole and the clamping hole form an inverted L-shaped clamping groove, and the locking insertion piece is an L-shaped buckle perpendicular to the sliding plate.

19. The connecting mechanism according to claim 13, wherein:
the conductive insertion piece comprises a spring pin mounting portion and a spring pin mounted on the spring pin mounting portion; and
the electrical connector is provided with an exposed copper area, and the spring pin is in contact with the exposed copper area.

20. The connecting mechanism according to claim 19, wherein a positioning plate is fixedly disposed on the detachable part, the positioning plate locates the buckling part on the detachable part, and the positioning plate is provided with a hollowed-out portion for avoiding the locking insertion piece and the conductive insertion piece.

* * * * *